(No Model.)
H. A. & J. KEIR.
HEATER FOR STOCK WATERING TROUGHS.
No. 398,052. Patented Feb. 19, 1889.
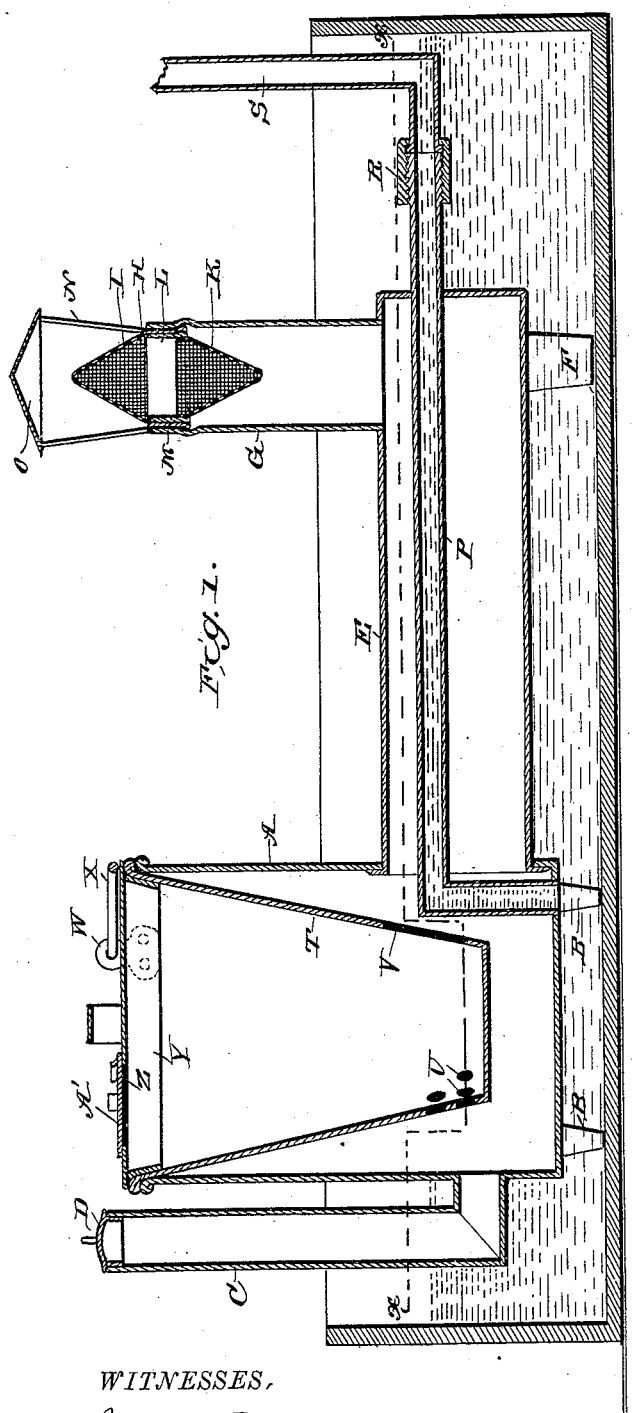
WITNESSES.
INVENTORS
Henry A. Keir
and John Keir
By C. A. Snow & Co.
his Attorneys.

UNITED STATES PATENT OFFICE.

HENRY A. KEIR AND JOHN KEIR, OF GREENSBOROUGH BEND, VERMONT.

HEATER FOR STOCK-WATERING TROUGHS.

SPECIFICATION forming part of Letters Patent No. 398,052, dated February 19, 1889.

Application filed March 21, 1888. Serial No. 267,959. (No model.)

*To all whom it may concern:*

Be it known that we, HENRY A. KEIR and JOHN KEIR, citizens of the United States, residing at Greensborough Bend, in the county of Orleans and State of Vermont, have invented a new and useful Improvement in Heaters for Stock-Watering Troughs, of which the following is a specification.

Our invention relates to an improvement in water-heaters; and it consists in the peculiar construction and combination of devices, which will be more fully set forth hereinafter, and particularly pointed out in the claim.

In the accompanying drawings, Figure 1 is a vertical longitudinal sectional view of a water-heater embodying our improvements. Fig. 2 is a horizontal sectional view of the same, taken on the line $x$ $x$ of Fig. 1.

A represents a vertical cylindrical vessel, which is provided on its lower side with supporting-feet B, of suitable depth. Communicating with one side of the vessel near the lower end thereof, is a vertical pipe, C, the upper end of which extends somewhat above the top of the vessel, and is adapted to be closed or uncovered by a stopper or plug, D. From one side of the vessel A, near the lower end thereof, extends a horizontal cylindrical flue, E, the inner end of which is open and communicates with the vessel A, and the outer end of which is closed. From the under side of the outer end of the cylindrical flue E depends a supporting foot and standard, F, and from the upper side of the said cylindrical flue E, at the outer end thereof, extends a vertical smoke-pipe, G, of suitable height. In the upper end of the smoke-pipe is arranged the spark-arrester H, which comprises a pair of cones, I K, which are made of wire-cloth or other suitable perforated material, and have their bases provided with collars L M, respectively, said collar L being of less diameter than the collar M and fitting snugly therein. The collar M fits snugly in the upper end of the smoke-pipe, and from said collar rises a pair of standards, N, which support a cone-shaped cap, O.

P represents a steam or water conducting pipe, which extends entirely through the cylindrical flue E, has its outer end projecting through the closed end of said flue, and has its inner end extended downward through the bottom of the vessel A. The outer end of the pipe P is provided with a screw-coupling, R, by means of which a steam-pipe, S, may be connected thereto or disconnected therefrom.

T represents a portable fire-box, which is adapted to fit in the vessel A, and is in the form of a truncated cone, the upper end of said fire-box being nearly equal in diameter to the diameter of the vessel A, and being adapted to fit snugly therein, so as to support the said portable fire-box in the vessel A, with the bottom and sides of the fire-box out of contact with the bottom and sides of the vessel. In one side of the fire-box, near the bottom thereof, are a series of openings, U, and in the opposite side thereof, in line with the openings U, is an opening, V, of suitable size. The said fire-box is provided at its upper edge, on opposite sides, with ears W, to which is connected a bail or handle, X, by means of which the fire-box may be removed from the vessel A or placed therein.

Y represents a cover or top which is adapted to close the upper end of the fire-box, is provided with an opening, Z, and has a slide, A', which is pivoted to the cover or top and is adapted to cover or uncover the opening Z.

Our invention is particularly designed for heating water in troughs to be used for scalding hogs or mixing with feed for cattle and horses, and is also designed for use in generating steam for cooking feed for live stock, and the operation thereof is as follows:

The vessel A, together with the cylindrical flue E, are placed in a trough of water at such a depth that the flue E is entirely or partially submerged, so that the outer end of the pipe P is beneath the level of the water. The fire-box is then suspended in the vessel A, and is arranged in such a position that its openings U are opposite the lower end of the pipe C and the opening V is opposite the inner end of the flue E. A fire is built in the fire-box, the cover placed thereon, and the stopper or plug D removed from the upper end of pipe C. A current of air then passes downward through the pipe C, enters the vessel A, and passes through the fire-box over and through the fuel, so as to promote combustion, and the smoke and products of combustion pass through the opening V of the fire-box into the cylindrical flue E and escape from thence through the smoke-pipe G and the spark-arrester H. The vessel A is heated by radiation from the fire-box, and the flue or tube E is heated by the products of combustion and flames passing through the same, and, inasmuch as said vessel A and tube or flue are partially submerged, it follows that the water in the trough will speedily become heated thereby. Inasmuch as the tube P communicates at both ends with the water, the said tube is constantly filled therewith, and as the said tube extends through the tubular flue E the water therein becomes intensely heated and escapes into the trough, and its place is instantly supplied by the water from the trough, and thus a constant circulation of water is maintained, and the water in the trough is as speedily reduced to the same temperature. When the water in the trough has become sufficiently heated, the heater is removed therefrom.

When it is desired to generate steam, the heater is placed in the trough, as before described, a fire started therein, and the steam-pipe S is coupled to the outer end of the pipe P, and the outer end of said pipe P is raised above the level of the water in the trough. By this means the water in the lower portion of pipe P is rapidly converted into steam, which escapes through the pipe S and is discharged at the desired point where the steam is to be used, and as fast as the water in the lower end of pipe P is converted into steam its place is supplied by water from the trough, as will be readily understood.

As the smoke and products of combustion ascend through the smoke-pipe G they strike against the lower perforated cone, I, which serves to arrest the sparks and causes them to drop into the lower side of the tube E. Any sparks which may pass through the meshes of the lower cone with the smoke and products of combustion will be arrested by the upper cone, K, and caused to drop into the lower cone. When it is desired to clear the spark-arrester of the accumulated cinders, the spark-arrester is removed from the upper end of the smoke-pipe, and the lower cone, I, is removed by withdrawing its collar L from the collar M.

When it is desired to prevent too active combustion of the fuel in the fire-box, this may be accomplished by turning the fire-box in the vessel A so that its openings U V will be out of line with the openings at the inner ends of pipe C and tubular flue E, the effect of this arrangement of the fire-box being to reduce the draft therethrough.

It will be observed that the vertical cylindrical vessel A has an entirely unobstructed interior, so that the fire-box can be readily placed therein, and by employing the portable fire-box we are not only enabled to regulate the draft at will by shifting the position of the fire-box, but we also preserve the vessel A, as the fire is out of contact with the said vessel and consequently cannot burn through and wear away the same. Furthermore, it will be observed that the draft carries the heat directly along the pipe P, so that the said pipe will be subjected to the action of the heat for a considerable period of time, and as the said pipe extends through the bottom of the vessel A the water will be admitted close to the fire-box, where the heat is greatest, and then carried through the flue E in a line parallel with the line of draft, so as to obtain the full benefit of the heat.

Having thus described our invention, we claim—

The improved heater for stock-watering troughs, consisting of the vertical cylindrical vessel A, the vertical flue C, and the horizontal flue E, communicating therewith at diametrically-opposite points near the bottom thereof, and the smoke-flue leading upward from the end of the flue E, the fire-box removably supported in the vessel A and having diametrically-opposite openings in its sides near its lower end, and adapted to be turned so as to bring said openings into or out of line with the flue E, and the pipe P, having one end extending through the bottom of the vessel A, thence extending vertically upward to near the fire-box, and thence horizontally through the flue E and projecting through the end of the same, as specified.

In testimony that we claim the foregoing as our own we have hereto affixed our signatures in presence of two witnesses.

HENRY A. KEIR.
JOHN KEIR.

Witnesses:
HARVEY C. LIBBEY,
JONATHAN CLARK ALLEN.